(12) United States Patent
Hanaoka et al.

(10) Patent No.: US 6,457,079 B1
(45) Date of Patent: Sep. 24, 2002

(54) COMMUNICATION APPARATUS WITH MEANS FOR ALLOCATING ALTERNATE DESIGNATION INFORMATION TO EACH FUNCTION UNIT, AND COMMUNICATION SYSTEM WITH SAID TWO COMMUNICATION APPARATUSES

(75) Inventors: Kunihiro Hanaoka, Kobe (JP); Shoji Akashita, Shinagawa-ku (JP); Osamu Tomioka, Shinagawa-ku (JP); Mitsukazu Kurose, Suwa (JP)

(73) Assignees: Kobe Steel, Ltd., Hyogo (JP); Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/475,251

(22) Filed: Dec. 30, 1999

(30) Foreign Application Priority Data

Mar. 3, 1999 (JP) ............................................ 11-055071

(51) Int. Cl.$^7$ .......................... G06F 13/14; G06F 15/16; G06F 12/00; G06F 13/42

(52) U.S. Cl. ........................ 710/105; 710/107; 710/305

(58) Field of Search ................................ 710/105, 100, 710/305, 107, 313, 315; 711/203; 370/351, 431, 465, 395.52; 709/250, 224, 226, 200, 238

(56) References Cited

U.S. PATENT DOCUMENTS

| | | | |
|---|---|---|---|
| 5,544,316 A | 8/1996 | Carpenter et al. | 395/200.03 |
| 5,572,680 A | * 11/1996 | Ikeda et al. | |
| 5,768,544 A | 6/1998 | Hauck | |
| 5,875,313 A | 2/1999 | Sescila, III et al. | |
| 5,978,894 A | * 11/1999 | Sukegawa et al. | |
| 6,014,383 A | 1/2000 | McCarty | 395/200.52 |
| 6,195,356 B1 | * 2/2001 | Anello et al. | |

FOREIGN PATENT DOCUMENTS

| | | |
|---|---|---|
| EP | 0 859 325 A2 | 2/1998 |
| JP | 6-295290 | 10/1994 |
| JP | 09-006662 | 1/1997 |
| JP | 09-016508 | 1/1997 |

(List continued on next page.)

OTHER PUBLICATIONS

European Search Report dated Feb. 21, 2002, search performed in The Hague.
Japanese Patent Office action on application P11–055071–dated Apr. 18, 2000.
Technical Editor, Peter Johansson, "Serial Bus Protocol 2 (SBP–2)," Working Draft, American National Standard for Information Systems, T10, Project 1155D, Revision 4, pp. 1–95 (May 19, 1998).

*Primary Examiner*—Gopal C. Ray

(57) ABSTRACT

A communication apparatus is provided for communicating with further communication apparatuses which are connected with the communication apparatus, and for allowing one of a plurality of function units to execute a predetermined process in accordance with a request signal from a further apparatus. In the case where one of the further communication apparatuses is permitted to communicate with the communication apparatus, when a request signal of start of communication is sent from another one of the further communication apparatuses different from the one of the further communication apparatuses which has been already permitted to communicate with the communication apparatus, a manager unit returns response information including the designation information stored in the memory to another one of the further communication apparatuses so as to permit another one of the further communication apparatuses to communicate with. the communication apparatus, and then, allocates to another one of the further communication apparatuses virtual alternate designation information, which is different from the virtual alternate designation information allocated to the one of the further communication apparatuses which has been already permitted to communicate with the communication apparatus.

8 Claims, 7 Drawing Sheets

FOREIGN PATENT DOCUMENTS

| | | |
|---|---|---|
| JP | 10-93623 | 4/1998 |
| JP | 10-243020 | 9/1998 |
| JP | 10-260903 | 9/1998 |
| JP | 10-283136 | 10/1998 |

* cited by examiner

LOGIN REQUEST BLOCK IN SBP-2

PACKET FORMAT IN IEEE1394 INTERFACE

LOGIN RESPONSE BLOCK IN SBP-2

LOGOUT REQUEST BLOCK IN SBP-2

COMMUNICATION APPARATUS WITH MEANS FOR ALLOCATING ALTERNATE DESIGNATION INFORMATION TO EACH FUNCTION UNIT, AND COMMUNICATION SYSTEM WITH SAID TWO COMMUNICATION APPARATUSES

BACKGROUND OF THE INVENTION

1. Field of the Invention

The present invention relates to a communication apparatus comprising means for allocating alternate designation information such as a virtual address or the like to each function unit, and a communication system comprising the above-mentioned two communication apparatuses which are communicated with each other. In particular, the present invention relates to a communication apparatus, for example, computers, peripheral equipments such as a printer or the like, various domestic digital equipments such as a digital still camera or the like, and a communication system comprising the above-mentioned two communication apparatuses which are communicated with each other via a serial bus conformed to IEEE 1394.

2. Description of the Related Art

For example, an ANSI X3.131-1986 Small Computer System Interface proposed by the ANSI (American National Standards Institute, Inc.) has been widely used thus far as an interface for carrying out data transmission between a personal computer, and peripheral equipments connected with the personal computer.

However, in so-called parallel SCSI standard of the above-mentioned interface standards, there is no rule relating to many matters such as a shape of a connector or cable, an operation of connecting equipments without power supply. As a result, problems arise in compatibility and convenience accompanying with popularization of the personal computer.

Moreover, in comparison with the time when the above-mentioned parallel SCSI standard has been proposed, recently, various domestic digital equipments are popularized. Further, a general household also requires a high speed interface which is adaptable for transmitting acoustic and image digital signal data.

Under such circumstances, some next-generation interface standards have been already proposed, and then, the IEEE 1394 interface is employed as an interface for transmitting data at a high speed between computers and peripheral equipments and between apparatuses including domestic equipments, and thus, digital equipments using the IEEE 1394 interface have been started to be merchandised.

The IEEE 1394 interface standard is proposed by IEEE (The Institute of Electrical and Electronics Engineers, Inc.), and then, is prescribed as IEEE Std. 1394-1995 IEEE Standard for a High Performance Serial Bus. More specifically, the IEEE 1394 interface standard is a very useful serial interface standard taking the use in a general household into consideration, that is, an interface conformed to the standard has a high transfer speed of several 100 Mbits/second, and supports a synchronous transfer, a hot-line insertion and drawing and a connection topology having a high degree of freedom.

For example, Japanese Patent Laid-open Publication (Kokai) No. 10-93623 discloses a technique of employing the above-mentioned IEEE 1394 interface.

As disclosed in the above publication, in the case of carrying out a digital data transmission with the use of a packet adding a destination information to a predetermined data block into which a digital data is divided, in order to improve the reliability of data transmission, when a packet transmitted from a transmitter equipment is received by a receiver equipment, the receiver equipment returns an acknowledgment signal indicative of a receiving state of the packet to the transmitter equipment of the printer apparatus 2a, and then, retransmits the packet from the transmitter equipment as the necessity arises.

Also, in the IEEE 1394 interface, there is the case where the above acknowledgment signal from the receiver equipment to the transmitter equipment is returned with respect to a request packet for request for an operation thereof.

For example, in a packet communication between a personal computer 1 and a printer apparatus 2a mutually connected the IEEE 1394 interface, as shown in FIG. 3, a request packet for requiring a predetermined operation is transmitted from the personal computer 1 to the printer apparatus 2a, and then, when the request packet is received by the printer apparatus 2a, the printer apparatus 2a returns an acknowledgment signal ACK indicative of a receiving state of the request packet to the personal computer 1.

The acknowledgment signal ACK includes information data for informing retransmission necessity and completion of reception of the printer apparatus 2a. For example, in the case where an acknowledgment signal ACK which requires retransmission is received by the personal computer 1, the same request packet is retransmitted from the personal computer 1 to the printer apparatus 2a. Then, in the case where a completion of reception is informed to the personal computer 1 by means of the above acknowledgment signal ACK, the printer apparatus 2a carries out a predetermined operation such as a print operation. Therefore, the personal computer 1 is in a waiting state until a response packet corresponding to the above request packet is transmitted from the printer apparatus 2a.

Further, when a predetermined operation is completed in the printer apparatus 2a, a response packet including the above predetermined operation result is transmitted from the printer apparatus 2a to the personal computer 1. When the response packet is received by the personal computer 1, an acknowledgment signal ACK indicative of a retransmission request or process completion is returned from the personal computer 1 to the printer apparatus 2a. In this case, if the above acknowledgment signal ACK is indicative of a retransmission request, the same response packet is retransmitted from the printer apparatus 2a to the personal computer 1. On the other hand, if the above acknowledgment signal ACK is indicative of process completion, the printer apparatus 2a is set to an opened state for the next process.

By the way, as one of application protocols in the IEEE 1394 interface is provided an SBP-2 (Serial Bus Protocol 2). In order to explain the SBP-2, a relation between the layer structure of the IEEE 1394 interface and the SBP-2 is shown in FIG. 4, which shows the personal computer 1 and the printer apparatus 2a are connected with each other via a serial data bus 3.

The layer structure of the IEEE 1394 interface layer 100 or 200 is fundamentally comprised of three layers of a physical layer 101 or 201, a link layer 102 or 202, and a transaction layer 103 or 203 as shown in FIG. 4. The SBP-2 belongs to a transport layer 104 or 204 at a layer position higher than that of the transaction layer 103 or 203. For example, the SBP-2 has not only a function of efficiently transferring commands and data among various kinds of apparatuses or devices (referred to as nodes hereinafter)

such as optical disk drive units, DVD drive units, magnetic tape drive units, scanners, digital cameras or the like, but also another function of notifying an application layer processing unit higher than the SBP-2, of operating states of commands, the results thereof, a state indicating whether or not data transfer is completed, or the like. It is to be noted that an application layer 105 or 205 is provided above the transport layer 104 or 204 of the SBP-2.

In the SBP-2, there is provided a node such as a scanner, a digital camera or the like, each having a function of not only issuing management request commands such as login for a connection request, a logout of completion of connection or the like, but also real commands such as a data read command, a data write command or the like, and this node is called an "initiator" apparatus. On the other hand, there is further provided another node such as an optical disk drive unit, a DVD drive unit, a CD-ROM drive unit, a printer, or the like, each having a function of receiving a command from the initiator apparatus and actually performing a process, and this another node is called a "target" apparatus. Communication is carried out between the initiator apparatus and the target apparatus.

With respect to the target apparatus, strictly speaking, a logical unit corresponding to an actual or real apparatus such as an optical disk drive unit, a CD-ROM drive unit, or a printer is dealt as a unit. Communication is executed between the logical unit, at least one of which is provided within the target apparatus, and the initiator apparatus.

FIG. 5 is a timing chart showing a communication sequence between the personal computer 1 of an initiator apparatus shown in FIG. 3 and a logic unit LU of the printer apparatus 2*a* of a target apparatus shown in FIG. 3. Further, FIG. 6 is a schematic diagram showing a data structure of a login request block in the SBP-2 of prior art, FIG. 7 is a schematic diagram showing one example of a packet format of a communication packet for use in the IEEE 1394 interface of prior art, FIG. 8 is a schematic diagram showing a data structure of a login response block in the SBP-2 shown in FIG. 6, and FIG. 9 is a schematic diagram showing a data structure of a logout request block in the SBP-2 of prior art.

A procedure of communication sequence carried out between the personal computer 1 of the initiator apparatus, and the logical unit LU of the printer apparatus 2*a* of the target apparatus is shown in FIG. 5.

Referring to FIG. 5, prior to transmission of all commands to the target apparatus 2, it is necessary for the initiator apparatus 1a to issue a login request signal to the logical unit LU of the target apparatus 2 with which communication is to be carried out. The data structure of the login request block in the SBP-2 is as shown in FIG. 6.

The data structure of the block in SBP-2 is called an ORB (Operation Request Blocks). As shown in FIG. 6, data "0" indicative of login is written into a "function" field of the login request block as a kind of control block. The logical unit LU of the printer apparatus 2*a* of the target apparatus to which the personal computer 1 of the initiator apparatus tries to log in is designated by a "lun" field indicative of the logical unit number.

The above-mentioned ORB is inserted into a data part of a transaction packet for use in the IEEE 1394 interface as shown in FIG. 7. The ORB is transferred by the transaction packet, and is sent from the personal computer 1 of the initiator apparatus designated by a "source ID" field in the header of the packet, to the printer apparatus 2*a* of the target apparatus designated by a "destination ID" field in the header of the packet.

When the login request packet from the personal computer 1 of the initiator apparatus is received by the printer apparatus 2*a* of the target apparatus, it is actually received and accepted by a mechanism or manager processing unit called a "manager agent", which processes a management block in the logical unit LU designated by the "lun" field stored in the printer apparatus 2*a* of the target apparatus. Information regarding the base address of a resister of the manager agent, which is called a "CSR" (Control and Status Register), is previously stored in a configuration ROM of the printer apparatus 2*a* of the target apparatus. By referring to the configuration ROM, the login request packet is allowed to be received and accepted by the manager agent.

It is judged by the manager agent whether or not it is set to such a status of permitting a login or capable of communicating in accordance with a login request signal. When it is set to the status of permitting a login, a login response signal corresponding to the login request packet is returned from the printer apparatus 2*a* of the target apparatus to the personal computer 1 of the initiator apparatus. The data structure of the login response block is as shown in FIG. 8.

As shown in FIG. 8, the "login response" block includes the followings:

(a) a "login ID" field for identifying a login; and
(b) a "command block agent" field for describing the base address of the CSR of a mechanism or a processing unit called a "fetch agent", which accepts a command request signal issued by the personal computer 1 of the initiator apparatus to the printer apparatus 2*a* of the target apparatus, and which performs a process of a function in the printer apparatus 2*a* of the target apparatus.

In a manner different from that of the manager agent, a relative address in the register or the like is predetermined for the fetch agent, however, the base address itself is allocated to some position in the resister space assured in the address space in the IEEE 1394 interface every login. The base address is necessary for the personal computer 1 of the initiator apparatus to allow the fetch agent to execute a command.

When the login is succeeded in such a manner, in the personal computer 1 of the initiator apparatus, the base address of the CSR of the fetch agent designated in the login response packet is referred to, and then, a request signal to execute a command such as a write command, a read command, or a lock command is transmitted from the personal computer 1 of the initiator apparatus to the printer apparatus 2*a* of the target apparatus by using the base address.

In the printer apparatus 2*a* of the target apparatus, a login identifier including a logical unit number lun, a login owner ID (or a source ID), . . . , and a login ID is held or stored. When the command execution request signal is received by the printer apparatus 2*a* of the target apparatus, the login ID corresponding to the source ID is referred to from the login identifier, the fetch agent is selected by using the base address corresponding to the login ID, and then, the command is executed. When the process of the command is completed, the result is notified to the personal computer 1 of the initiator apparatus by using the status block of the packet.

When the necessary commands have been executed in the printer apparatus 2*a* of the target apparatus in accordance with the above-mentioned procedure, the personal computer 1 of the initiator apparatus issues a logout request signal to the printer apparatus 2*a* of the target apparatus. The data structure of the logout request block is as shown in FIG. 9.

As shown in FIG. 9, the logout request block includes a "login ID" field in which the login ID used for the communication is described or written in. Further, "7" indicative of logout is described in the "function" field.

When the logout request packet is received by the printer apparatus 2a of the target apparatus, it is accepted by the manager agent in the printer apparatus 2a of the target apparatus. The base address of the fetch agent used until then is set so as to be reused on the basis of the login ID. When the logout process is finished, a notification of completion is sent to the personal computer 1 of the initiator apparatus by using the status block. By the operation, the communication is finished and the designated logical unit in the printer apparatus 2a of the target apparatus is released.

In the above-mentioned communication system using the IEEE 1394 and SBP-2, when a logical unit of a target apparatus to which a login request signal is sent from an initiator apparatus has already been logged in by another initiator apparatus, a new login request signal from, the initiator apparatus is refused.

Even when the logical unit has sufficient resources and a fetch agent other than the fetch agent used by the other initiator apparatus can execute a process, the initiator apparatus which newly issues the login request signal cannot perform communication with the logical unit until the other initiator apparatus which has already logged in logs out.

SUMMARY OF THE INVENTION

In order to solve such problems of the prior art, it is an essential object of the invention to provide a communication apparatus and a communication system comprising the two communication apparatuses which includes first and second communication apparatuses, in which in the case where the first communication apparatus capable of executing a predetermined process already permits any of one or more second communication apparatus connected to the first communication apparatus to carry out communication, when a communication start is requested by another second communication apparatus which is different from the second communication apparatus which has already been permitted to perform communication, response information including the same designation information as that included in response information returned to the second communication apparatus which has already been permitted to perform communication is returned to another second communication apparatus to thereby permit another second communication apparatus to perform communication.

In order to achieve the aforementioned objective, according to one aspect of the present invention, there is provided a communication apparatus for communicating with a plurality of further communication apparatuses which are connected with the communication apparatus, and for allowing one of a plurality of function units to execute a predetermined process in accordance with a request signal from a further apparatus, comprising:

manager unit for determining designation information for designating one of the plurality of function units in accordance with a request signal for start of communication from a further communication apparatus when the communication apparatus does not communicate with any further communication apparatuses, and returning response information including the determined designation information to the further communication apparatus so as to allow the further communication apparatus to communicate with the communication apparatus, wherein the manager unit further comprises allocating means for storing the determined designation information in a memory means, and for allocating virtual alternate designation information in stead of the designation information to the one of the plurality of function units, in correspondence with one of the further communication apparatuses which has sent the request signal for start of communication, and wherein, in the case where one of the further communication apparatuses is permitted to communicate with the communication apparatus, when a request signal of start of communication is sent from another one of the further communication apparatuses different from the one of the further communication apparatuses which has been already permitted to communicate with the communication apparatus, the allocating means returns response information including the designation information stored in the memory means to another one of the further communication apparatuses so as to permit another one of the further communication apparatuses to communicate with the communication apparatus, and then, allocates to another one of the further communication apparatuses virtual alternate designation information, which is different from the virtual alternate designation information allocated to the one of the further communication apparatuses which has been already permitted to communicate with the communication apparatus.

In the above-mentioned communication apparatus, in accordance with a request signal for executing the predetermined process by using the designation information from the one of the further communication apparatuses which has been already permitted to communicate with the communication apparatus, the allocating means preferably selects one of the plurality of function units corresponding to the one of further communication apparatuses, among the plurality of function units, with reference to the virtual alternate designation information stored in the memory means.

In the above-mentioned communication apparatus, preferably, the communication apparatus is connected to the further communication apparatuses via an interface conformed to an IEEE 1394 standard, and an SBP-2 (Serial Bus Protocol 2) is used as an application protocol in the interface.

According to another aspect of the present invention, there is provided a communication system comprising:

a first communication apparatus comprising a plurality of function units, each of which execute a predetermined process; and a plurality of second communication apparatuses, each of which are communicated with the first communication apparatus, wherein the first communication apparatus comprises manager unit for determining designation information for designating one of the plurality of function units in accordance with a request signal for start of communication from one of the second communication apparatuses when the first communication apparatus does not communicate with any one of second communication apparatuses, and returning response information including the determined designation information to the one of second communication apparatuses so as to allow the one of second communication apparatuses to communicate with the first communication apparatus, wherein the manager unit further comprises allocating means for storing the determined designation information in a memory means, and for allocating virtual alternate designation information in stead of the designation information to the one of the plurality of function units, in correspondence with the one of the second communication apparatuses which has sent the request signal for start of communication, and wherein, in the case where one of the second communication apparatuses is permitted to communicate with the first communication apparatus, when a request signal of start of communication is sent from another one of the second communication apparatuses different from the one of the second communication apparatuses which has been already permitted to communicate with the first communication apparatus, the allocating means returns response information including the designation information stored in the memory means to another one of the second communication apparatuses so as to permit another one of the second communication apparatuses to communicate with the first communication apparatus, and then, allocates to another one of the second communication apparatuses virtual alternate designation information, which is different from the virtual alternate designation information allocated to the one of the second communication apparatuses which has been already permitted to communicate with the first communication apparatus.

In the above-mentioned communication system, in accordance with a request signal for executing the predetermined process by using the designation information from the one of the second communication apparatuses which has been already permitted to communicate with the first communication apparatus, the allocating means preferably selects one of the plurality of function units corresponding to the one of second communication apparatuses, among the plurality of function units, with reference to the virtual alternate designation information stored in the memory means.

In the above-mentioned communication system, preferably, the first communication apparatus is connected to the second communication apparatuses via an interface conformed to an IEEE 1394 standard, and an SBP-2 (Serial Bus Protocol 2) is used as an application protocol in the interface.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Preferred embodiments according to the present invention will be described below with reference to the attached drawings. The following preferred embodiments are described as examples of embodying the present invention and the technical scope of the invention is not limited to them.

Figure 1:
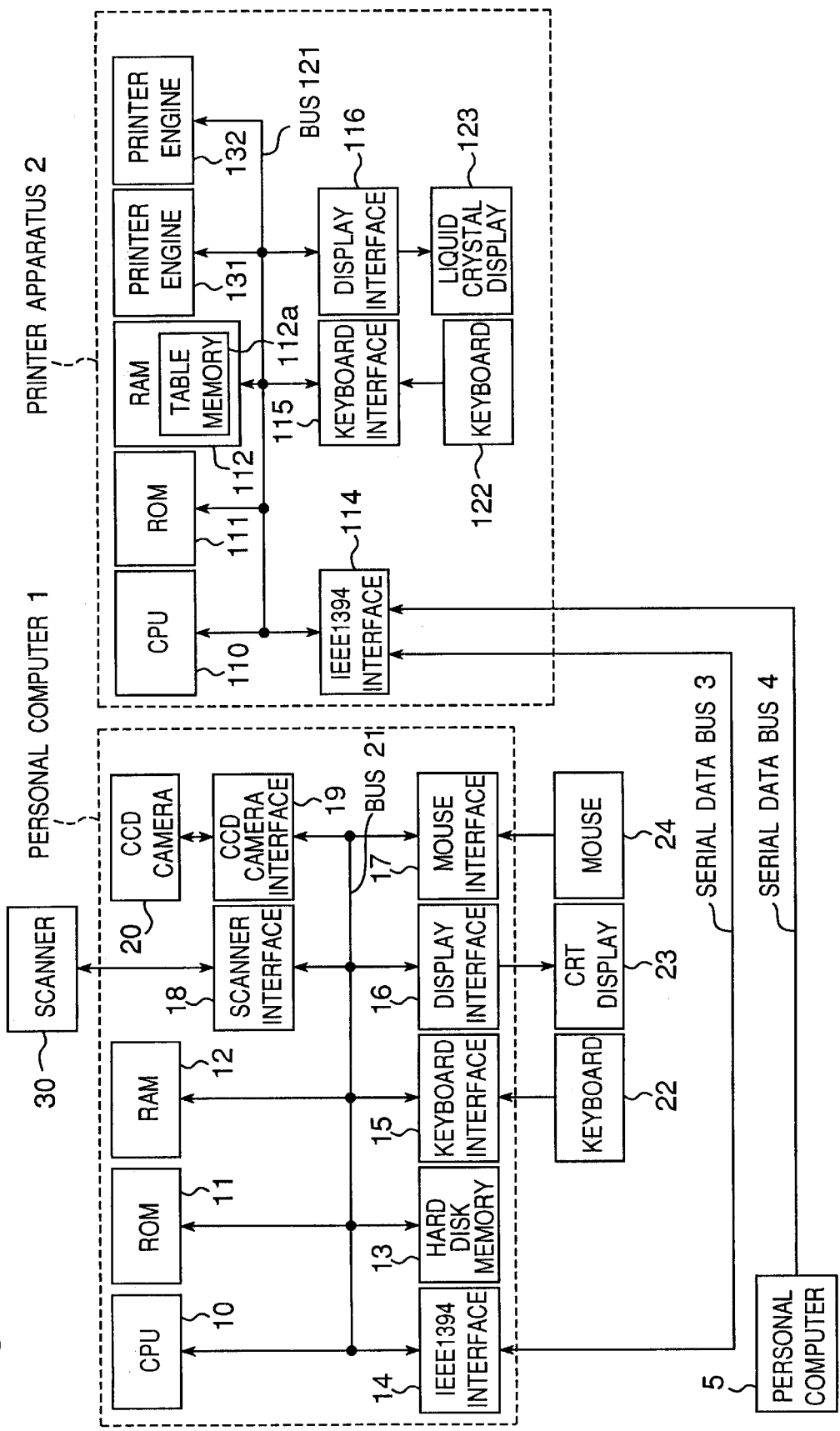
FIG. 1 is a block diagram showing a configuration of a packet communication system comprising personal computers 1 and 5, and a printer apparatus 2, according to a preferred embodiment of the present invention.
Figure 2:
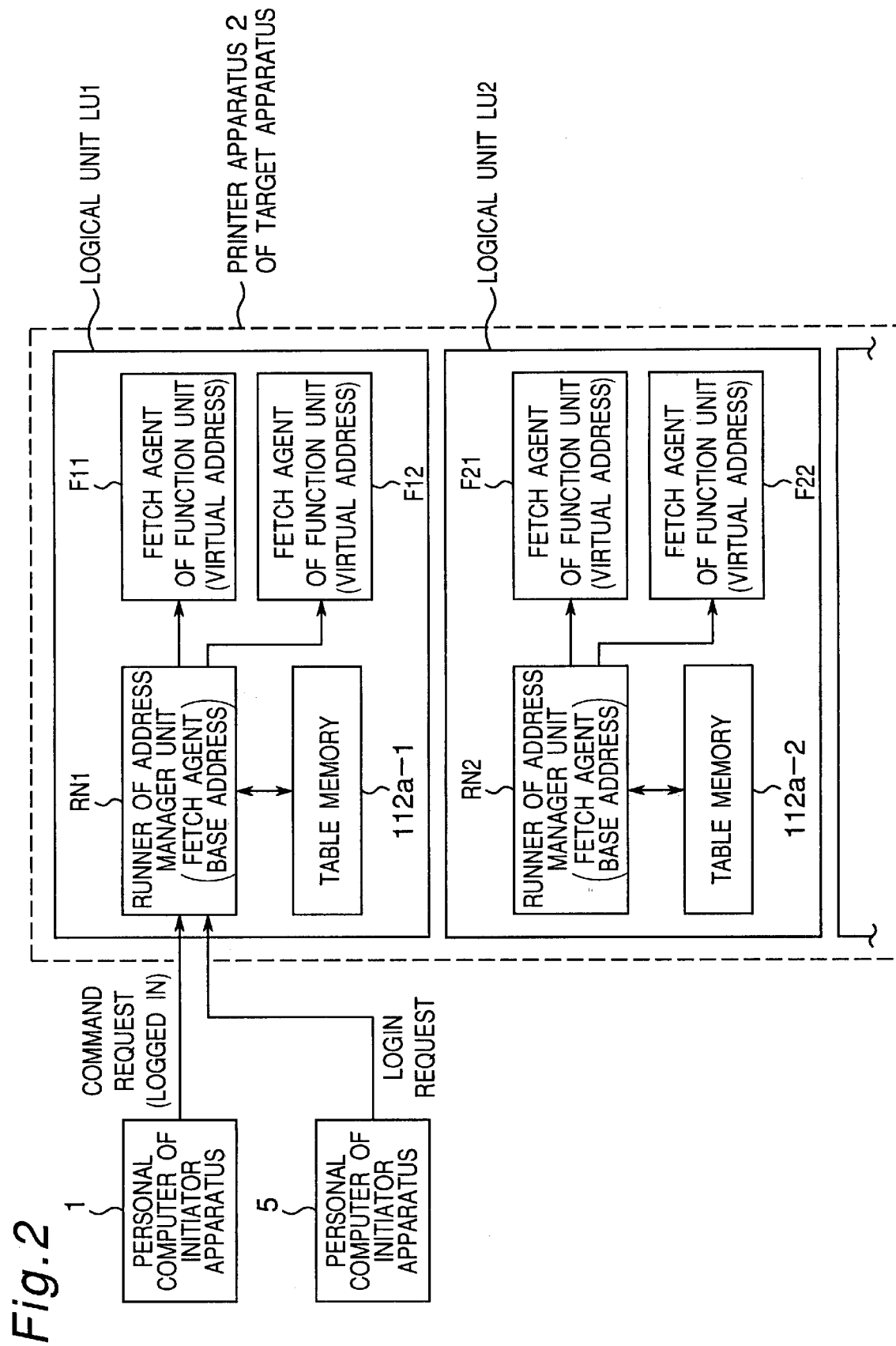
FIG. 2 is a block diagram showing a detailed schematic configuration of the packet communication system shown in FIG. 1.
Figure 3:
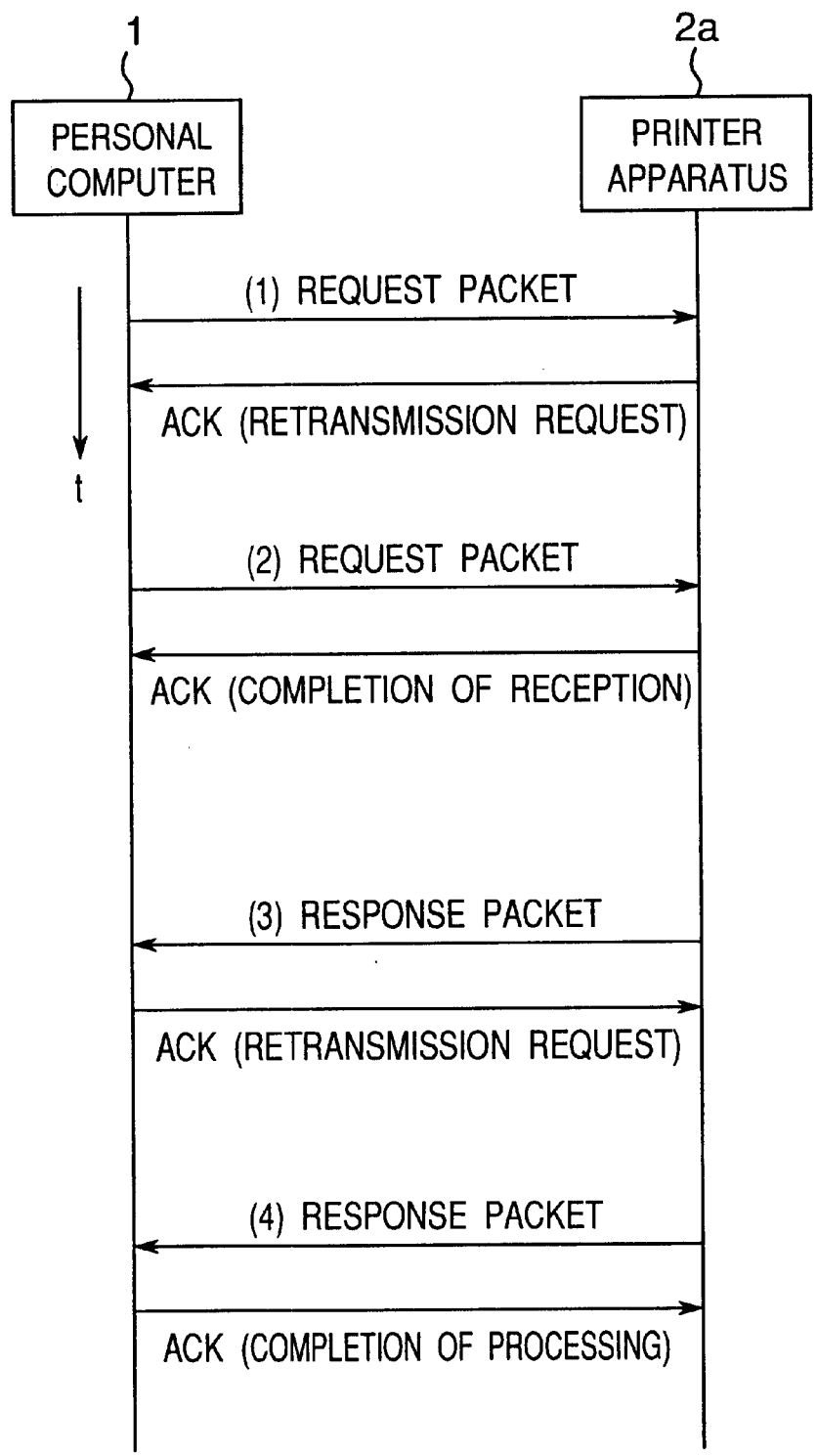
FIG. 3 is a timing chart showing a communication sequence between a personal computer 1a and a printer apparatus 2 connected with each other via the IEEE 1394 interface of prior art.
Figure 4:
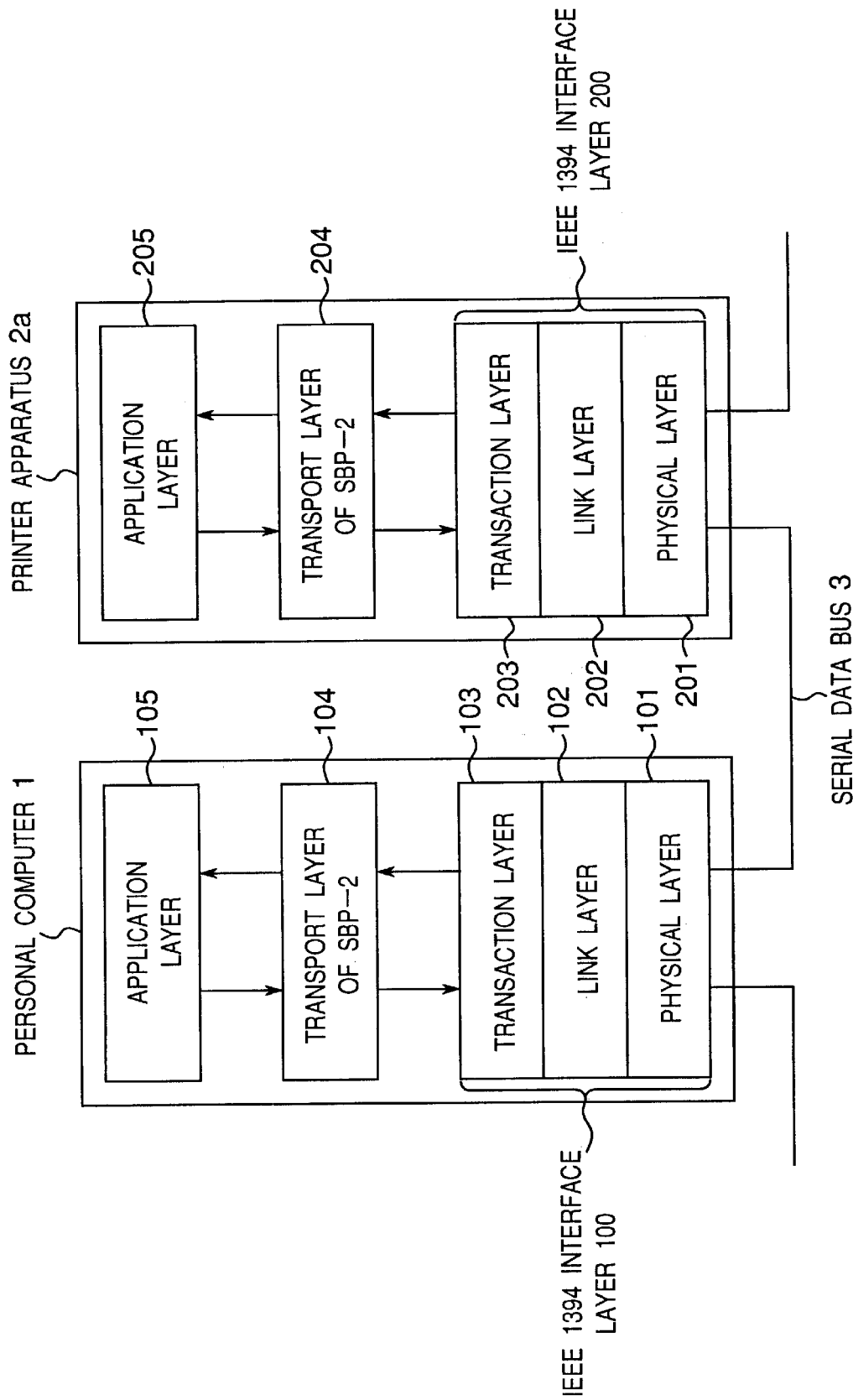
FIG. 4 is a block diagram showing a layer configuration of the communication system shown in FIG. 3.
Figure 5:
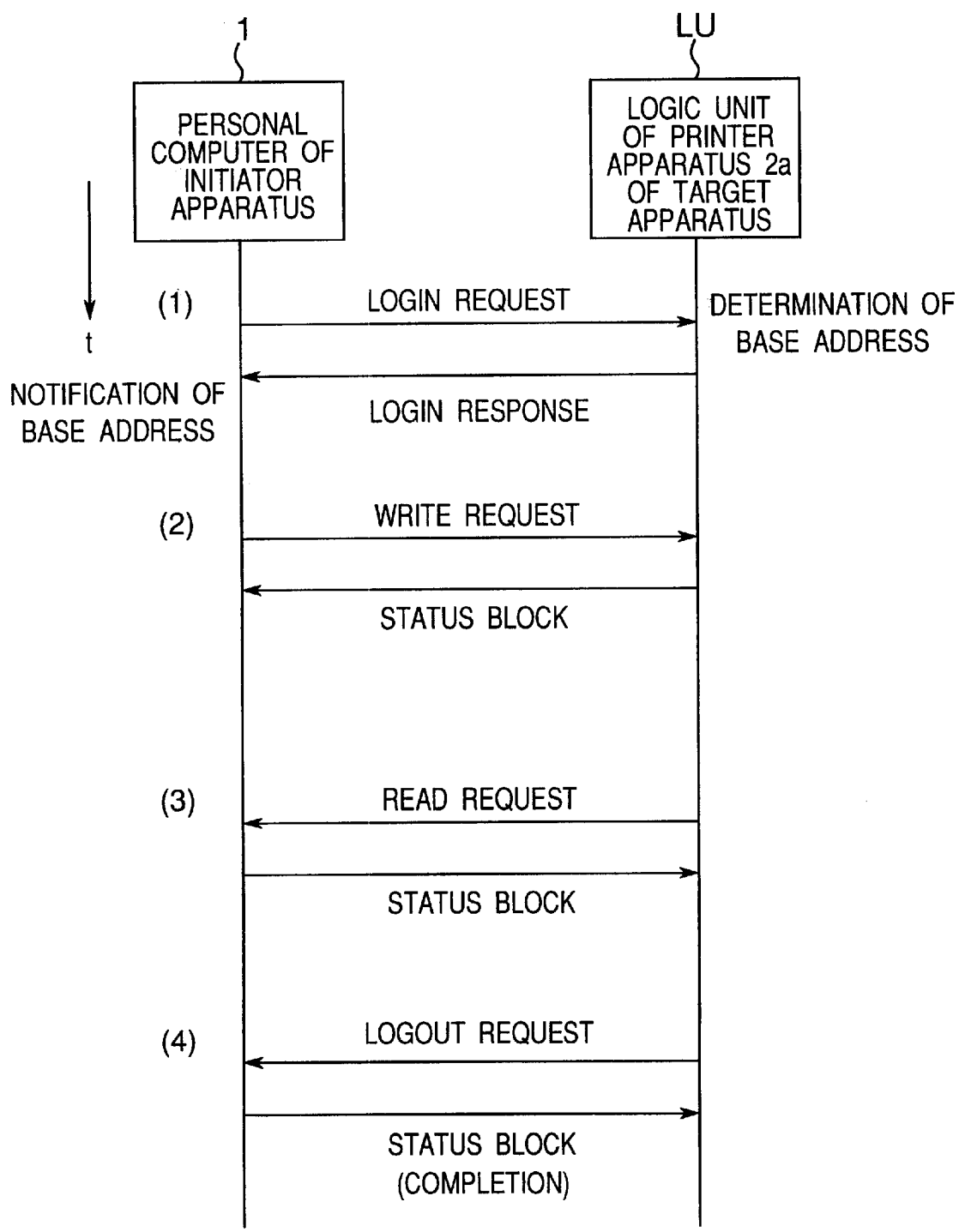
FIG. 5 is a timing chart showing a communication sequence between the personal computer 1a of an initiator apparatus shown in FIG. 3 and a logic unit LU of the printer apparatus 2 of a target apparatus shown in FIG. 3.
Figure 6:
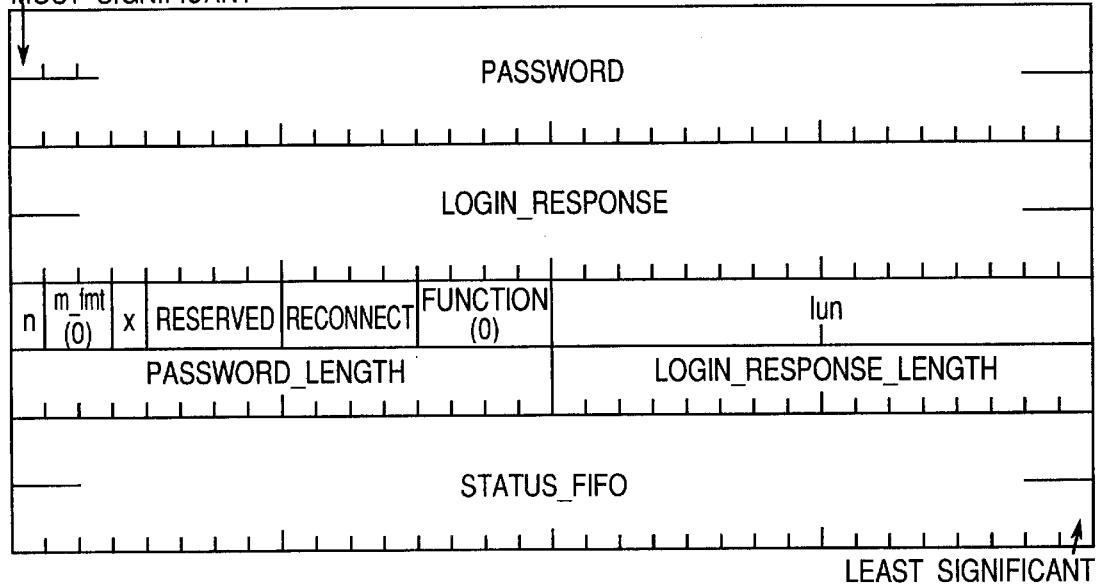
FIG. 6 is a schematic diagram showing a data structure of a login request block in the SBP-2 (Serial Bus Protocol 2) of prior art.
Figure 7:
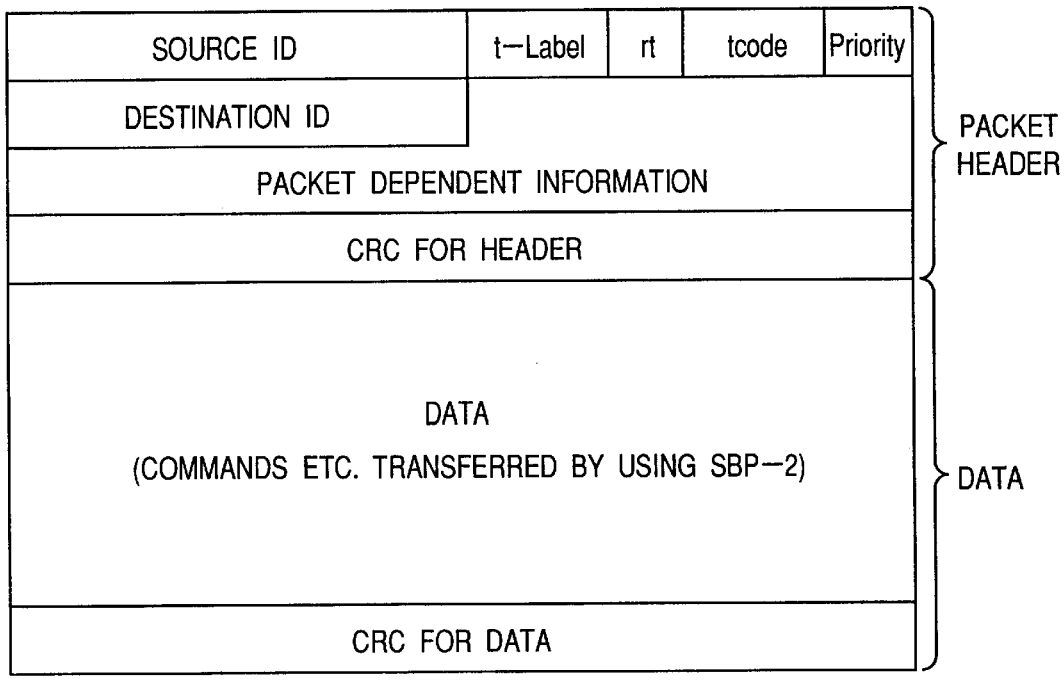
FIG. 7 is a schematic diagram showing one example of a packet format of a communication packet for use in the IEEE 1394 interface of prior art.

FIG. 1 is a block diagram showing a configuration of a packet communication system comprising personal computers 1 and 51 and a printer apparatus 2, according to a preferred embodiment of the present invention, and FIG. 2 is a block diagram showing a detailed schematic configuration of the packet communication system shown in FIG. 1.

Referring to FIG. 1, the communication system of the present preferred embodiment comprises the personal computer 1 having a packet communication apparatus, the personal computer 5 having a packet communication apparatus, and the printer apparatus 2 having another packet communication apparatus. In the communication system, an IEEE 1394 interface of the printer apparatus 2 is connected with not only an IEEE 1394 interface of the personal computer 1 via a serial data bus 3 conformed to the IEEE 1394 standard, but also an IEEE 1394 interface of the personal computer 5 via another serial data bus 4 conformed to the IEEE 1394 standard. As peripheral units of the personal computer 1, there are provided a keyboard 22, a CRT display 23, a mouse 24 and a scanner 30.

The personal computer 1 comprises the followings:

(a) a CPU (central processing unit) 10 of a digital computer for executing operating system programs and application programs stored in a ROM 11 and a hard disk memory 13 to control the operation and process of the personal computer 1;

(b) the ROM (read-only memory) 11 for storing basic programs such as operation programs and data required for execution of the programs;

(c) RAM (random access memory) 12 for operating as a working memory of the CPU 10, and for temporarily storing parameters and data needed for the operation and process of the personal computer 1;

(d) a hard disk memory 13, for example, for storing the application programs and data used upon executing the application programs;

(e) the IEEE 1394 interface 14 for performing signal conversion, and transmitting and receiving processes conformed to the IEEE 1394 standard, for packet data which are transmitted from the CPU 10 to the printer apparatus 2, and which are received from the printer apparatus 2;

(f) a keyboard interface 15 connected with the keyboard 22 which is provided for inputting predetermined data or instruction commands, where the keyboard interface 15 receives data and instruction commands inputted through the keyboard 22, performs an interface process such as a predetermined signal conversion or the like, and transmits the data or the instruction commands to the CPU 10;

(g) a display interface 16 connected with the CRT display 23 which displays an image of image data or information data processed by the CPU 10, or an image for inputting setting data, instruction data, or the like, where the display interface 16 converts the image data to be displayed into an image signal for the CRT display 23, outputs the image signal to the CRT display 23, and allows the CRT display 43 to display the image of the image signal;

(h) a mouse interface 17 connected with the mouse 24 which is provided for inputting instruction commands on the CRT display 23, where the mouse interface 17 receives data or the instruction commands inputted through the mouse 24, performs an interface process such as a predetermined signal conversion or the like, and transmits the data or the instruction commands to the CPU 10;

(i) a scanner interface 18 connected with the scanner 30 which is provided for reading an image and converting a read image into an image signal, where the scanner interface 18 receives the image signal outputted from the scanner 30, performs an interface process such as a predetermined signal conversion or the like, and transmits the image signal to the CPU 10 or the hard disk memory 13;

(j) a CCD camera 20 provided in the personal computer 1, where the CCD camera 20 takes a picture image, converts the image into an image signal, and outputs the same image signal to the CPU 10 or the hard disk memory 13; and (k) a CCD camera interface 19 connected with the CCD camera 20, where the CCD camera interface 19 receives the image signal outputted from the CCD camera 20, performs an interface process such as a predetermined signal conversion or the like, and transmits the image signal to the CPU 10 or the hard disk memory 13, where these circuits 10–19 are connected through an internal bus 21.

Also, the personal computer 5 comprises components similar to those of the personal computer 1. Further, the printer apparatus 2 comprises the followings:

(a) a CPU (central processing unit) 110 of a digital computer for executing operating system programs and application programs stored in a ROM 111 to control the operation and printing process of the printer apparatus 2;

(b) the ROM (read-only memory) 111 for storing basic programs such as operation programs, application programs, and data required for execution of these programs;

(c) RAM (random access memory) 112 for operating as a working memory of the CPU 110, and for temporarily storing parameters and data needed for the operation and printing process of the printer apparatus 2, where the RAM 112 comprises a table memory 112a including a plurality of table memories 112a-1, 112a-2, ... which are connected with runners RN1, RN2, ... each of a address manager unit as shown in FIG. 2, and each of which stores a relation table between a fetch agent base address allocated to each of the runner RN1, RN2, ... and virtual addresses allocated to each of fetch agents F11, F12, F21, F22, ...;

(d) the IEEE 1394 interface 114 for performing signal conversion, and transmitting and receiving processes conformed to the IEEE 1394 standard, for packet data which are transmitted from the CPU 10 to either the personal computer 1 or 2, and which are received from the personal computer 1 or 2;

(e) a keyboard interface 115 connected with a keyboard 122 which is provided for inputting predetermined data or instruction commands, where the keyboard interface 115 receives data and instruction commands inputted through the keyboard 122, performs an interface process such as a predetermined signal conversion or the like, and transmits the data or the instruction commands to the CPU 110;

(f) a display interface 116 connected with a liquid crystal display 123 which displays an image of image data or information data processed by the CPU 110, or an image for inputting setting data, instruction data, or the like, where the display interface 116 converts the image data to be displayed into an image signal for the liquid crystal display 123, outputs the image signal to the liquid crystal display 123, and allows the liquid crystal display 123 to display the image of the image signal;

(g) a printer engine 131 for printing on a sheet of paper an image of image data included packet data received by the IEEE 1394 interface 114; and (h) a printer engine 132 for printing on a sheet of paper an image of image data included packet data received by the IEEE 1394 interface 114, where these circuits 110–116, 131 and 132 are connected through an internal bus 121.

In the ROM 111, there are stored application programs for the runners RN1, RN2, ..., and the fetch agents F11, F12, F21, F22, ...

Referring to FIG. 2, in the communication system of the preferred embodiment, packet communication is made between each of a plurality of personal computers 1 and 5 which serve as initiator apparatuses, and the printer apparatus 2 which serves as a target apparatus, via the serial data bus conformed to the IEEE 1394 standard and the SBP-2. The printer apparatus 2 of the target apparatus has a plurality of logical units LU1, LU2, ... which provide a plurality of independent functions such as printer functions or the like, and which are provided in correspondence with the printer engines 131 and 132. Each of the logical units LU1 and LU2 has a plurality of mechanisms or processing units which are called "fetch agents" F11, F12, F21, F22, ... each of which executing a predetermined process related to each function such as print buffering, expansion of image data, or the like in the preferred embodiment. When the personal computer 1 or 5 of the initiator apparatus allows the logical unit LU1 or LU2 of the printer apparatus 2 of the target apparatus to provide a predetermined function, the predetermined process is executed by the fetch agent (one of F11, F12, F21, F22, ...) managed or controlled by the runner RN1 or RN2 of the logical unit LU1 or LU2. In the preferred embodiments, each of the runners RN1, RN2, ... serve as an address manager unit, and each of the fetch agents F11, F12, F21, F22, ... serve as a function unit as described above.

As shown in FIG. 2, the table memory 112a-1 is connected with the runner RN1 which is connected with the fetch agents F11 and F12, and the table memory 112a-1 stores not only a relation table between a fetch agent base address (designation information) allocated or designated to the runner RN1 and the logical unit LU1, and virtual addresses (virtual alternate designation information) allocated or designated to the fetch agents F11 and F12, but also a relation between an initiator apparatus and one of the fetch agents F11 and F12 which now communicate with each other.

In the present preferred embodiment, when the logical unit LU1 does not communicate with any of the plurality of initiator apparatuses such as the personal computers 1 and 5, in accordance with a request signal for start of communication sent from the personal computer of the initiator apparatus to, for example, the logical unit LU1 in the printer apparatus 2 of the target apparatus, the runner RN1 of the logical unit LU1 determines a base address (an example of designation information) for designating the plurality of fetch agents F11 and F12 managed or controlled by the runner RN1 of the logical unit LU1 with reference to data stored in the table memory 112a-1, and then, returns response information including the determined base address so as to permit the personal computer 1 of the initiator apparatus to communicate with one of the fetch agents F11 and F12. Thereafter, the personal computer 1 of the initiator apparatus allows one of the fetch agents F11 and F12 to execute a predetermined process such as print function or the like using the base address returned from the runner RN1 of the printer apparatus 2 of the target apparatus.

The packet communication system according to the preferred embodiment of the present invention is characterized in further comprising the runners RN1 and RN2, which will be described in detail below, in addition to that of prior art. The printer apparatus 2 of the target apparatus has a mechanism or a processing unit called runners RN1 and RN2 (allocating means for allocating alternate designation information) for storing the determined base address in the table memory 112a-1 or 112a-2 and allocating a virtual address (virtual alternate designation information) in stead of the determined base address to one of the fetch agents F11, F12, F21, F22, . . . in correspondence with the personal computer 1 or 5 of the initiator apparatus which has requested the start of communication.

For example, when the runner RN1 of the logical unit LU1 of the printer apparatus 2 of the target apparatus have already permit, for example, the personal computer 1 of the initiator apparatus to communicate with the fetch agent F11 through the runner RN1 of the logical unit LU1, in accordance with a request signal for start of communication sent from the personal computer 5 of the initiator apparatus different from the personal computer 1 of the initiator apparatus which has already been permitted to communicate, the runner RN1 returns response information including the stored base address which is the same as that included in the response information returned to the personal computer 1 of the initiator apparatus which has already been permitted to communicate, so as to permit the personal computer 5 of another initiator apparatus to communicate with the runner RN1 of the logical unit LU1. Further, the runner RN1 also allocates a virtual address to the personal computer 5 of another initiator apparatus, which is different from the virtual address allocated to the personal computer 1 of the initiator apparatus which has already been permitted to communicate. Thereafter, in accordance with a request for execution of a predetermined process such as print operation by using the base address designation information from the personal computer 1 of the initiator apparatus which is permitted to communicate, another fetch agent F12 corresponding to the personal computer 5 of another initiator apparatus is selected referring to the virtual address with reference to data stored in the table memory 112a-1.

The details of the packet communication system according to the preferred embodiment will be described hereinbelow.

The procedure of a sequence of communication performed between the personal computer 1 or 5 of the initiator apparatus and the printer apparatus 2 of the target apparatus is similar to that of prior art which has been already described with reference to FIGS. 4 to 9 and the detailed description of similar parts is omitted here.

In prior art, the base addresses of the CSR of each of the fetch agents F11, F12, F21, F22, . . . are predetermined so as to allocate above an address of FFFF F001 1000$_{16}$ (hexadecimal notation) in 48 bits of the node address. On the other hand, in the packet communication system according to the preferred embodiment, in accordance with a first request signal for start of communication start request sent from the personal computer 1 of the initiator apparatus to, for example, the runner RN1 of the logical unit LU1 of the printer apparatus 2 of the target apparatus, one of the above base addresses is allocated to the runner RN1 in stead of the fetch agents F11, F12, F21, F22, . . . , and then, are stored in the table memory 112a-1. Thereafter, one of virtual addresses which are managed by the runner RN1 and are stored in the table memories 112a-1 is allocated to, for example, the fetch agent F11 which execute a predetermined actual process.

The runner RN1 has the table memory 112a-1 for storing therein a login ID used to identify a request signal for start of communication, a fetch agent, a virtual address allocated to the fetch agent, and a source ID of an initiator apparatus, which are stored in correspondence with each other. In the case of allocating a virtual address to a fetch agent which is one of the fetch agents F11, F12, F21 and F22, a login ID is described or written at a virtual address in the table memory 112a-1. The virtual address, the fetch agent, the login ID and the source ID are set in connection with each other.

The personal computer 1 of the initiator apparatus which has first sent the request signal for start of communication is notified or informed of the login ID regarding the login and the base address of the CSR of the fetch agent F11 stored in the table memory 112a-1 of the runner RN1 by means of a login response packet, with reference to the source ID.

Figure 8:
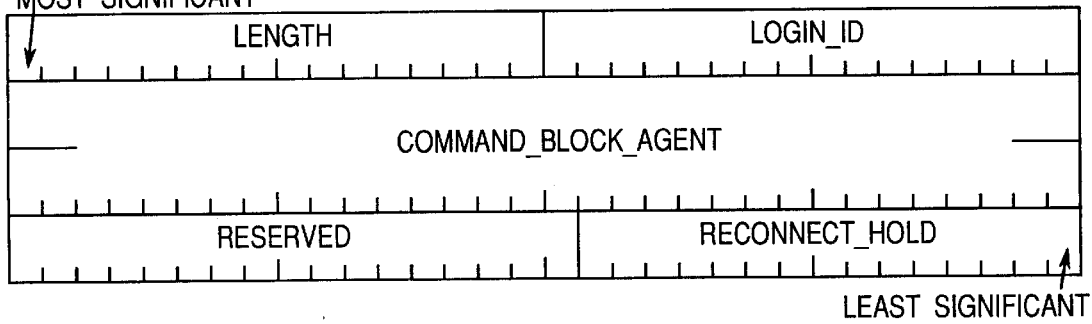
FIG. 8 is a schematic diagram showing a data structure of a login response block in the SBP-2 shown in FIG. 6.
Figure 9:
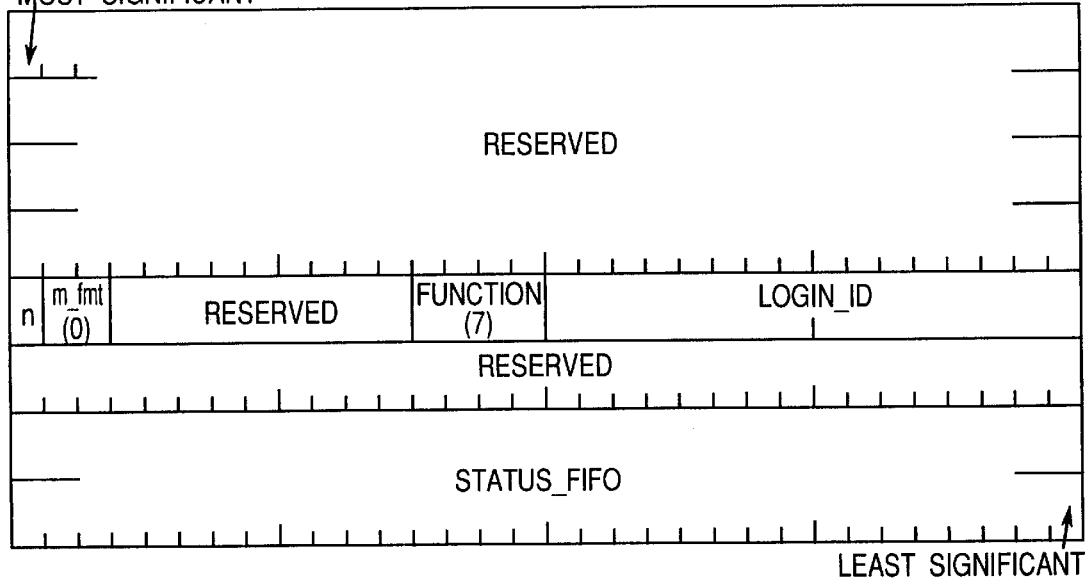
FIG. 9 is a schematic diagram showing a data structure of a logout request block in the SBP-2 of prior art.

In the other words, the login response packet in which the login ID regarding the login and the base address of the CSR of the fetch agent F11 stored in the table memory 112a-1 of the runner RN1 are described in a "login ID" field and a "command block agent" field stored in FIG. 8, respectively, is returned from the printer apparatus 2 of the target apparatus to the personal computer 1 of the initiator apparatus. Thereafter, the personal computer 1 of the initiator apparatus requests the runner RN1 to execute the predetermined process by using the base address of the CSR of the fetch agent F11 stored in the table memory 112a-1 of the runner RN1.

When the logical unit LU1 of the printer apparatus 2 of the target apparatus has been logged in by the personal computer 1 of the initiator apparatus, in the prior art, another personal computer 5 of the initiator apparatus cannot log in to the logical unit LU1 until logout is performed by a request of the personal computer 1 of the initiator apparatus.

On the contrary, in the packet communication system of the preferred embodiment, when the second login request to the logical unit LU1 is sent from another personal computer 5 of the initiator apparatus, from the runner RN1 to another personal computer 5 of the initiator apparatus is returned a login response packet, in which the base address same as that notified to the personal computer 1 of the initiator apparatus, that is, the base address stored in the table memory 112a-1 of the runner RN1 is described in the "command block agent" field and a login ID different from the one allocated in response to the login request of the personal computer 1 of the initiator apparatus is also described in the "login ID" field. As a result, another personal computer 5 of the initiator apparatus is permitted to login.

Further, in the runner RN1, a virtual address which can be allocated, that is, a virtual address different from the virtual address corresponding to the fetch agent F11 is retrieved with reference to the table memory 112a-1 for the fetch agent F12 corresponding to another personal computer 5 of the initiator apparatus. Then, the retrieved virtual address and another login ID for the fetch agent F12 are described or written into the table memory 112a-1, and then, the different virtual address, the fetch agent F12, and another login ID are set in connection with each other.

Thereafter, in accordance with a request signal for execution of command for one of the fetch agents F11 and F12 sent by using the base address described in the "command block agent" field of the login response packet from any one of the personal computers 1 and 5 of the initiator apparatus which is permitted to communicate, the request signal for execution of command is received by the runner RN1. The runner RN1 checks to which login request or login ID the received request signal corresponds, from the source ID of the command described in the command of the request signal, with reference to the table memory 112a-1, specifies the corresponding fetch agent and the virtual address allocated to the fetch agent, and makes the fetch agent operate.

In the communication system of the preferred embodiment, while accepting a plurality of logins to a logic unit, the fetch agent corresponding to the command requested by the initiator apparatus which logged in is correctly selected, and the selected fetch agent can execute a predetermined process such as print operation or the like.

Although the number of fetch agents managed by the runner RN1 or RN2 is two in the present preferred embodiment, the invention is not limited to this. Three or more fetch agents can be also managed by one runner RN1 or RN2.

In the preferred embodiment, the number of the logical units LU1 and LU2 of the printer apparatus 2 of the target apparatus is set to two, however, the present invention is not limited to this. The number of logical units LU1 and LU2 of the printer apparatus 2 of the target apparatus may be one or more, and is described in the configuration ROM indicating the attribute of the target apparatus preliminarily assembled in the printer apparatus 2 of the target apparatus. It is to be noted that the configuration ROM (not shown) is provided in the IEEE 1394 interface 114.

Although the two personal computers 1 and 5 of the initiator apparatuses are connected with the printer apparatus 2 of the target apparatus, the invention is not limited to this. The present invention can be also applied to such a case that three or more initiator apparatuses are connected with the target apparatus.

When one logical unit is logged in by a plurality of different initiator apparatuses, there is a possibility that a new command request is issued from another initiator apparatus while a command request from one of the initiator apparatuses is processed by the logical unit. In this case, for example, the new command request is spooled and the process is performed after completion of execution of the first command request.

In the preferred embodiment, the personal computers 1 and 5 are provided as the initiator apparatus and the printer apparatus 2 is provided as the target apparatus, however, the present invention is not limited to this. The initiator apparatus may be a scanner, a digital still camera, a digital video camera, or the like. The target apparatus may be a optical disk drive unit, a DVD drive unit, a CD-ROM drive unit, or the like.

According to the preferred embodiment of the present invention, the following advantageous effects can be provided.

(a) a plurality of initiator apparatus can login at the same time, and this provides the packet communication system capable of efficiently executing a predetermined process.

(b) Even when a request for execution of a predetermined process is sent from any one of the initiator apparatus while a plurality of initiator apparatuses are logging in at the same time, there can be properly selected one function unit of executing means corresponding to the above initiator apparatus.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A communication apparatus for communicating with a plurality of further communication apparatuses which are connected with said communication apparatus, and for allowing one of a plurality of function units to execute a predetermined process in accordance with a request signal from a further apparatus, comprising:

manager unit for determining designation information for designating one of the plurality of function units in accordance with a request signal for start of communication from a further communication apparatus when said communication apparatus does not communicate with any further communication apparatuses, and returning response information including the determined designation information to the further communication apparatus so as to allow the further communication apparatus to communicate with said communication apparatus, wherein said manager unit further comprises allocating means for storing the determined designation information in a memory means, and for allocating virtual alternate designation information in stead of the designation information to said one of the plurality of function units, in correspondence with one of the further communication apparatuses which has sent the request signal for start of communication, and wherein, in the case where one of the further communication apparatuses is permitted to communicate with said communication apparatus, when a request signal of start of communication is sent from another one of the further communication apparatuses different from said one of the further communication apparatuses which has been already permitted to communicate with said communication apparatus, said allocating means returns response information including the designation information stored in said memory means to said another one of the further communication apparatuses so as to permit said another one of the further communication apparatuses to communicate with said communication apparatus, and then, allocates to said another one of the further communication apparatuses virtual alternate designation information, which is different from the virtual alternate designation information allocated to said one of the further communication apparatuses which has been already permitted to communicate with said communication apparatus.

2. The communication apparatus as claimed in claim 1,
wherein in accordance with a request signal for executing said predetermined process by using said designation information from said one of the further communication apparatuses which has been already permitted to communicate with said communication apparatus, said allocating means selects one of the plurality of function units corresponding to said one of further communication apparatuses, among said plurality of function units, with reference to the virtual alternate designation information stored in said memory means.

3. The communication apparatus as claimed in claim 2,
wherein said communication apparatus is connected to said further communication apparatuses via an interface conformed to an IEEE 1394 standard, and
wherein an SBP-2 (Serial Bus Protocol 2) is used as an application protocol in said interface.

4. The communication apparatus as claimed in claim 1,
wherein said communication apparatus is connected to said further communication apparatuses via an interface conformed to an IEEE 1394 standard, and
wherein an SBP-2 (Serial Bus Protocol 2) is used as an application protocol in said interface.

5. A communication system comprising:
a first communication apparatus comprising a plurality of function units, each of which execute a predetermined process; and
a plurality of second communication apparatuses, each of which are communicated with said first communication apparatus,
wherein said first communication apparatus comprises manager unit for determining designation information for designating one of the plurality of function units in accordance with a request signal for start of communication from one of the second communication apparatuses when said first communication apparatus does not communicate with any one of second communication apparatuses, and returning response information including the determined designation information to said one of second communication apparatuses so as to allow said one of second communication apparatuses to communicate with said first communication apparatus,
wherein said manager unit further comprises allocating means for storing the determined designation information in a memory means, and for allocating virtual alternate designation information in stead of the designation information to said one of the plurality of function units, in correspondence with said one of the second communication apparatuses which has sent the request signal for start of communication, and
wherein, in the case where one of the second communication apparatuses is permitted to communicate with said first communication apparatus, when a request signal of start of communication is sent from another one of the second communication apparatuses different from said one of the second communication apparatuses which has been already permitted to communicate with said first communication apparatus, said allocating means returns response information including the designation information stored in said memory means to said another one of the second communication apparatuses so as to permit said another one of the second communication apparatuses to communicate with said first communication apparatus, and then, allocates to said another one of the second communication apparatuses virtual alternate designation information, which is different from the virtual alternate designation information allocated to said one of the second communication apparatuses which has been already permitted to communicate with said first communication apparatus.

6. The communication system as claimed in claim 5,
wherein in accordance with a request signal for executing said predetermined process by using said designation information from said one of the second communication apparatuses which has been already permitted to communicate with said first communication apparatus, said allocating means selects one of the plurality of function units corresponding to said one of second communication apparatuses, among said plurality of function units, with reference to the virtual alternate designation information stored in said memory means.

7. The communication system as claimed in claim 6,
wherein said first communication apparatus is connected to said second communication apparatuses via an interface conformed to an IEEE 1394 standard, and
wherein an SBP-2 (Serial Bus Protocol 2) is used as an application protocol in said interface.

8. The communication system as claimed in claim 5,
wherein said first communication apparatus is connected to said second communication apparatuses via an interface conformed to an IEEE 1394 standard, and
wherein an SBP-2 (Serial Bus Protocol 2) is used as an application protocol in said interface.

* * * * *